United States Patent
Tanjo et al.

(10) Patent No.: US 10,026,953 B2
(45) Date of Patent: Jul. 17, 2018

(54) MIXED ELECTRODE FOR NONAQUEOUS ELECTROLYTE BATTERY, AND MANUFACTURING METHOD FOR THE SAME

(71) Applicant: Automotive Energy Supply Corporation, Zama-shi, Kanagawa (JP)

(72) Inventors: Yuji Tanjo, Yokohama (JP); Hiroaki Tanizaki, Yokohama (JP); Tatsuji Numata, Kawasaki (JP); Yoshihiro Niida, Sagamihara (JP); Yukinori Takahashi, Hitachinaka (JP)

(73) Assignee: AUTOMOTIVE ENERGY SUPPLY CORPORATION, Kanagawa (JP)

( * ) Notice: Subject to any disclaimer, the term of this patent is extended or adjusted under 35 U.S.C. 154(b) by 364 days.

(21) Appl. No.: 14/653,468

(22) PCT Filed: Dec. 16, 2013

(86) PCT No.: PCT/JP2013/083639
§ 371 (c)(1),
(2) Date: Jun. 18, 2015

(87) PCT Pub. No.: WO2014/098037
PCT Pub. Date: Jun. 26, 2014

(65) Prior Publication Data
US 2016/0197339 A1    Jul. 7, 2016

(30) Foreign Application Priority Data
Dec. 18, 2012   (JP) .................................. 2012-275738

(51) Int. Cl.
*H01M 4/62*   (2006.01)
*H01M 4/36*   (2006.01)
(Continued)

(52) U.S. Cl.
CPC ......... *H01M 4/364* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

| 6,682,850 B1 | 1/2004 | Numata et al. |
| 2001/0018149 A1 | 8/2001 | Yageta et al. |

(Continued)

FOREIGN PATENT DOCUMENTS

| EP | 1117145 A1 | 7/2001 |
| JP | H11-260416A A | 9/1999 |

(Continued)

OTHER PUBLICATIONS

Extended European Search Report dated Sep. 24, 2015 issued in corresponding European Patent Application No. 13866234.1.
(Continued)

*Primary Examiner* — Tracy Dove
(74) *Attorney, Agent, or Firm* — Troutman Sanders LLP

(57) ABSTRACT

A mixed electrode for a nonaqueous electrolyte battery includes: a first active material; a second active material that reacts with water more easily than the first active material; an organic moisture capture agent; and an organic binder that binds the first active material and the second active material. The organic moisture capture agent is present in the organic binder and the first active material has a smaller specific surface area than the second active material. Thus, the storability of the mixed electrode is improved and when the mixed electrode is applied to the battery, the cycle characteristics of the battery are improved.

5 Claims, 1 Drawing Sheet

(51) Int. Cl.
*H01M 4/131* (2010.01)
*H01M 4/1391* (2010.01)
*H01M 4/505* (2010.01)
*H01M 4/525* (2010.01)
*H01M 4/04* (2006.01)
*H01M 4/02* (2006.01)

(52) U.S. Cl.
CPC ......... *H01M 4/1391* (2013.01); *H01M 4/505* (2013.01); *H01M 4/525* (2013.01); *H01M 4/62* (2013.01); *H01M 4/623* (2013.01); *H01M 4/625* (2013.01); *H01M 4/622* (2013.01); *H01M 2004/028* (2013.01)

(56) References Cited

U.S. PATENT DOCUMENTS

| | | | |
|---|---|---|---|
| 2002/0061439 | A1 | 5/2002 | Nemoto |
| 2003/0027046 | A1 | 2/2003 | Hosokawa et al. |
| 2011/0151327 | A1 | 6/2011 | Imanari |
| 2012/0015245 | A1 | 1/2012 | Kishino et al. |
| 2014/0079996 | A1* | 3/2014 | Zou ................. H01M 4/131 |
| | | | 429/212 |

FOREIGN PATENT DOCUMENTS

| | | | |
|---|---|---|---|
| JP | 2000-077097 | A | 3/2000 |
| JP | 2001-196065 | A | 7/2001 |
| JP | 2002-042817 | A | 2/2002 |
| JP | 2003-272705 | A | 9/2003 |
| JP | 2006-278322 | A | 10/2006 |
| JP | 2010-067436 | A | 3/2010 |
| JP | 2010-198899 | A | 9/2010 |
| JP | 2012-038725 | A | 2/2012 |
| JP | 2012-243463 | A | 12/2012 |

OTHER PUBLICATIONS

International Search Report and Written Opinion dated Mar. 4, 2014, which issued during the prosecution of International Patent Application No. PCT/JP2013/083639.

International Preliminary Examination Report dated Mar. 5, 2015 and annexes, which issued during the prosecution of International Patent Application No. PCT/JP2013/083639.

* cited by examiner

MIXED ELECTRODE FOR NONAQUEOUS ELECTROLYTE BATTERY, AND MANUFACTURING METHOD FOR THE SAME

CROSS-REFERENCE TO RELATED APPLICATIONS

This application is a U.S. National Phase Application under 35 U.S.C. § 371 of International Patent Application No. PCT/JP2013/083639 filed Dec. 16, 2013, which claims priority to Japanese Patent Application No. 2012-275738 filed Dec. 18, 2012. The International Application was published on Jun 26, 2014, as International Publication No. WO 2014/098037 under PCT Article 21(2). The entire contents of these applications are hereby incorporated herein by reference.

TECHNICAL FIELD

The present disclosure relates to a mixed electrode for a nonaqueous electrolyte battery and a manufacturing method for the same.

BACKGROUND ART

In a nonaqueous electrolyte battery typified by a lithium ion secondary battery, moisture is a factor that deteriorates the cycle characteristics. In view of this, conventionally, mixing a moisture capture agent in an electrode active material layer has been suggested. JP-A-11-260416 (Patent Literature 1) has disclosed the lithium ion battery in which zeolite with the moisture absorption property is mixed in an electrode active material layer.

In the technique disclosed in JP-A-2000-077097 (Patent Literature 2), lithium manganate with high safety as a main positive electrode active material has lithium nickelate mixed therein as another positive electrode active material. This causes lithium nickelate to operate as a hydrogen ion capture agent, thereby suppressing the elution of manganese.

An electrode of a nonaqueous electrolyte battery is formed so that a number of active material particles generally having electric conductivity are bound with each other through a binder. At the same time as intercalating or deintercalating ions, the active material particles generate charges. The charges are transferred between the active material particle and the current collector through a contact point between the active material particles.

Incidentally, in the battery with the structure according to Patent Literature 1, zeolite is taken as the solid insulating particle in the electrode active material layer. Therefore, zeolite cannot carry charges even when zeolite is in contact with the active material particle. For this reason, zeolite has interrupted the current flow. Patent Literature 1 also describes that zeolite is set outside the electrode and inside the battery case. In this case, zeolite does not adversely affect the charge transfer in the electrode. However, zeolite is set at the place away from the place where the presence of moisture leads to a problem, i.e., where the electrochemical reaction occurs. Thus, the effective water absorption by zeolite has not been realized.

From another perspective, it has also been known that the active material layer is formed to include a plurality of kinds of mixed active material particles with different characteristics and this active material layer is used in the electrode as disclosed in Patent Literature 2. In Patent Literature 2, however, in the mixed electrode including the mixed plural kinds of active material particles, one active material particle with high resistance against moisture in the air may be combined with another active material particle that easily reacts with moisture in the air. For example, lithium nickelate easily causes the reaction that generates impurities such as lithium hydroxide by the action of the moisture in the air as compared to other active materials such as lithium oxide. Thus, lithium nickelate easily causes deterioration. Moreover, the impurities generated by the deterioration have resulted in the lower battery cycle characteristics.

In this regard, for example, examination has not been sufficiently conducted on the use of a moisture capture agent as the moisture countermeasure for improving the storability of the electrode in the system employing a mixed electrode including the active material with low resistance against the moisture such as lithium nickelate and another active material that have been mixed.

CITATION LIST

Patent Literatures

Patent Literature 1: JP-A-11-260416
Patent Literature 2: JP-A-2000-077097

SUMMARY OF THE INVENTION

One embodiment of the present disclosure relates to a mixed electrode for a nonaqueous electrolyte battery including: a first active material; a second active material that reacts with water more easily than the first active material; an organic moisture capture agent; and an organic binder that binds the first active material and the second active material. The organic moisture capture agent is present in the organic binder and the first active material has a smaller specific surface area than the second active material.

The other embodiments of the present disclosure relate to a manufacturing method for a mixed electrode for a nonaqueous electrolyte battery including: preparing slurry having at least a first active material, a second active material that reacts with water more easily than the first active material and that has a larger specific surface area than the first active material, an organic binder, a solvent, and an organic moisture capture agent; and applying the slurry.

According to the present disclosure, it is possible to efficiently improve the storability of the mixed electrode and improve the battery cycle characteristics in the application of the mixed electrode to the battery.

DESCRIPTION OF THE EMBODIMENTS

Figure 1:
FIG. 1 is a schematic sectional diagram illustrating a nonaqueous electrolyte battery 1 having an example of a mixed electrode for a nonaqueous electrolyte battery according to the present disclosure.

In an example of a manufacturing method for a mixed electrode for a nonaqueous electrolyte battery according to the present disclosure, slurry is prepared to include at least a first active material (hereinafter referred to as an active material A), a second active material (hereinafter referred to as an active material B) that reacts with water more easily than the active material A and has a larger specific surface area than the active material A, an organic binder, a solvent that dissolves the organic binder, and an organic moisture capture agent. Next, the slurry is applied to a member such as a member constituting the electrode or a member disposed adjacent to the electrode. Preferably, the slurry is applied onto a negative electrode current collector or a positive electrode current collector.

By the manufacturing method, the mixed electrode for a nonaqueous electrolyte battery including the active material A, the active material B, the organic moisture capture agent, and the organic binder that binds the active materials A and B is obtained. In the mixed electrode for a nonaqueous electrolyte battery, the organic moisture capture agent exists in the organic binder. The specific surface area of the active material A is smaller than that of the active material B.

A first feature in one example of the present disclosure is that since the organic moisture capture agent is organic, the dispersibility of the organic moisture capture agent in the organic binder is excellent and that the fixability of the organic moisture capture agent in the organic binder after curing is excellent. The dispersibility is excellent because of, for example, the following reason. Many of the organic binders can be dissolved in organic solvent such as an organic resin material. By selecting the organic material as the moisture capture agent, the moisture capture agent can be dissolved in the organic solvent. Therefore, in the manufacture of the electrode, the homogeneous organic solvent solution including the organic binder and the moisture capture agent can be prepared. This homogeneous solution is considered convenient for the homogeneous dispersion. The fixability is excellent because of, for example, the following reason. Because of the steric hindrance unique to the organic material, molecules of the organic moisture capture agent cannot move easily in the polymer matrix in the resin-based organic binder (hereinafter also referred to as binder resin). As a result, the organic moisture capture agent can be present in the binder resin without affecting the conductive path between the active materials included in the electrode.

A second feature in one example of the present disclosure is that, comparing the active materials A and B included in the electrode, the active material B reacts with water more easily than the active material A and has a larger specific surface area than the active material A. By selecting the active materials A and B as above, it is possible to increase the area of the active material B with the large specific surface area that is in contact with the surrounding binder resin per unit mass as compared to the area of the active material A with the small specific surface area. In other words, since the film of the binder resin is attached to cover the surface of the active material in the film formation of the electrode, the amount of binder resin attached to the active material per unit mass is larger in the active material B with the larger specific surface area. Therefore, the organic moisture capture agent dispersed homogeneously in the binder resin exists more around the active material B.

Note that the specific surface area of the active materials A and B refers to the surface area of the active materials A and B per unit mass. These specific surface areas are represented by the following formula (1):

$$C_S = S/\rho V \text{ (}C_S\text{: specific surface area of active material, } S\text{: surface area of active material, } \rho\text{: density of active material, } V\text{: volume of active material)} \quad (1)$$

Here, the specific surface area can be obtained by the measurement of BET specific surface area by the nitrogen adsorption method.

As described above, in one example of the present disclosure, the organic moisture capture agent can be selectively distributed so as to exist more around the active material B that easily reacts with water by combining the above two features. In this manner, in the mixed electrode including at least the active material A and the active material B that reacts with water more easily than the active material A, the organic moisture capture agent can be distributed selectively around the active material B that easily reacts with water. Therefore, by the use of a small addition amount of organic moisture capture agent, the reaction between water and the active material B that easily reacts with water can be effectively suppressed. As a result, the deterioration in active material B in the electrode storage and the generation of impurities are suppressed. Moreover, the cycle characteristics of the battery in which this electrode is used as at least one of the positive electrode and the negative electrode are improved.

In addition to the above point, the operation effects as below can be obtained by reducing the addition amount of organic moisture capture agent.

A first effect is that the adverse influence on the battery characteristics due to the electrolysis of the organic moisture capture agent, which has been eluted in the electrolyte solution of the battery out of the organic binder, during the movement between the positive and negative electrodes, can be minimized.

A second effect is described below.

The amount of organic binder included in the mixed electrode cannot be determined arbitrarily. The range of usable amount is determined by the characteristics of the mixed electrode (such as the particle diameter and specific surface area of the active materials A and B, the designed thickness of the layer including the active material, the designed porosity, and the allowable range of the adhesion strength to the current collector). The amount of organic binder is, for example, preferably 0.5 to 20 parts by mass relative to 100 parts by mass of the active material. When the organic binder is less than 0.5 parts by mass, the binding force between the active materials A and B may be insufficient. When the organic binder is more than 20 parts by mass, the space between the active materials A and B is overfilled with the organic binder; therefore, the pore volume enough to have the electrolyte solution therein may not be secured. More preferably, the content of the organic binder is 1 to 10 parts by mass relative to 100 parts by mass of the active material.

Therefore, the range of the usable amount of the organic moisture capture agent used for the organic binder is a certain range in accordance with the usable amount of the organic binder. In the present disclosure, the addition amount of organic moisture capture agent can be reduced as above. The organic moisture capture agent can be effectively disposed around the active material B with low resistance against water. Therefore, a small amount of organic moisture capture agent can be effectively used in the mixed electrode.

The addition amount of organic moisture capture agent is preferably 0.001 to 10 parts by mass relative to 100 parts by mass of the organic binder.

The mixed electrode for a nonaqueous electrolyte battery according to the present disclosure may be applied as the positive electrode or the negative electrode or as the positive electrode and the negative electrode in one battery.

Figure 2:
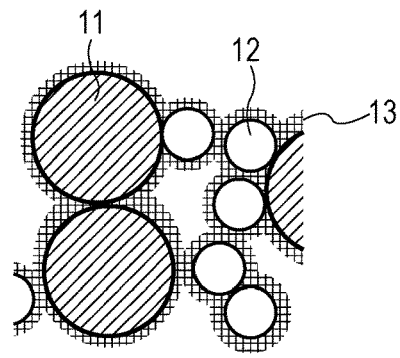
FIG. 2 is a magnified diagram of a part of a positive electrode active material layer 7 of the battery 1 of FIG. 1.
Figure 3:
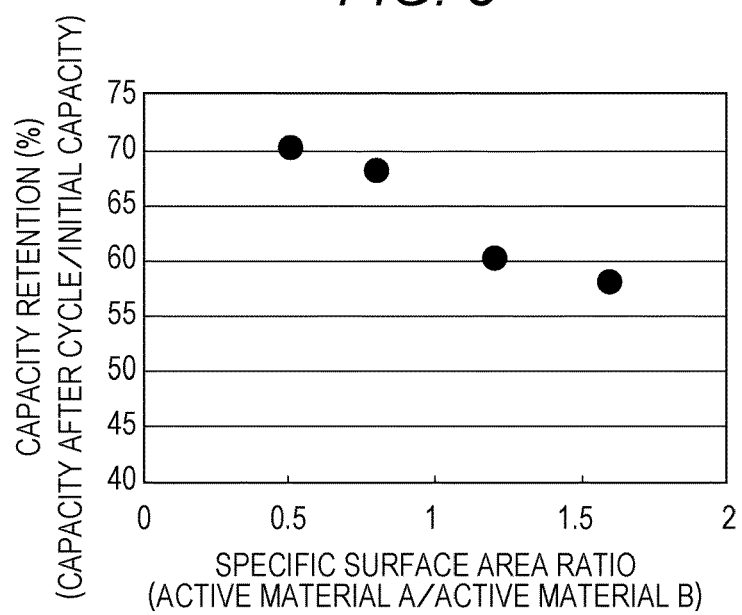
FIG. 3 is a diagram representing the relation between the specific surface area ratio and the capacity retention in Examples 1 and 2 and Comparative Examples 1 and 2.

FIG. 1 is a schematic sectional diagram illustrating the nonaqueous electrolyte battery 1 having one example of the mixed electrode for a nonaqueous electrolyte battery according to the present disclosure. FIG. 2 is a magnified diagram of a part of the positive electrode active material layer 7 of the battery 1 in FIG. 1. As illustrated in FIG. 1, the nonaqueous electrolyte battery 1 has a structure in which a positive electrode current collector 5, a positive electrode active material layer 7 formed on the positive electrode current collector 5, a separator 8, a negative electrode active material layer 9, and a negative electrode current collector 4 are stacked in order. The positive electrode active material layer 7, the separator 8, and the negative electrode active material layer 9 are impregnated with the electrolyte solution. In the battery 1 illustrated in FIG. 1, the positive electrode active material layer 7 includes the active material A, the active material B that reacts with water to deteriorate more easily than the active material A, the organic moisture capture agent, and the binder resin that binds the active materials A and B (none of them are shown in FIG. 1).

FIG. 2 is a magnified diagram illustrating a part of the positive electrode active material layer 7 of the battery of FIG. 1. The shape and the like of the active material particle and the shape and the like of the attached binder resin are illustrated merely schematically. The scope of the present disclosure is not limited to FIG. 2. The positive electrode active material layer 7 includes an active material A11, an active material B12, a binder resin 13, and an organic moisture capture agent and a conductive auxiliary agent, which are not shown. The binder resin 13 exists between the active materials A11 and B12, i.e., covering entirely or partially the surface of the active materials. This causes the binder resin 13 to bind the active material A11 and the active material B12. As described above, the organic moisture capture agent is distributed homogeneously in the binder resin 13. The active material A11 has a smaller specific surface area than the active material B12. Therefore, as a result, the organic moisture capture agent is distributed to exist more around the active material B12 than around the active material A11 per unit mass. Here, when the moisture coming from the outside of the battery 1 passes through the pore between the active materials and reaches the surface of the active material, the moisture is partially captured by the organic moisture capture agent existing near the surface of the active material. On this occasion, the moisture is more often captured by the organic moisture capture agent in the active material B12 than in the active material A11 per unit mass. As a result, the deterioration of the active material B12, which reacts with water to deteriorate more easily than the active material A11, due to water can be suppressed efficiently by the organic moisture capture agent.

Each member included in the mixed electrode for a nonaqueous electrolyte battery according to the present disclosure is hereinafter described. The members described below are just examples and the members used in the mixed electrode of the present disclosure are not limited to the members below.

[Active Material A]

The active material A has a smaller specific surface area than the active material B. Examples of the active material A include a lithium-manganese composite oxide and a composite oxide containing less nickel among lithium-nickel-cobalt-manganese composite oxide, preferably, a composite oxide with a Ni/Li molar ratio of less than 0.5, an olivine lithium composite oxide, and lithium cobaltate.

[Active Material B]

The active material B is a material that reacts with water more easily than the active material A. As the method of evaluating reactivity with water, for example, after the storage for a certain period in the air containing moisture, the amount of generated compounds with the composition different from the compounds constituting the active material is measured. For example, in the case of the active material including the lithium-transition metal oxide, the compound containing a transition metal element serving as a core, which has the composition different from the original compound, is quantified. This enables the evaluation of the degree of decomposition of the compounds constituting the original lithium-transition metal oxide.

As the active material B, for example, lithium-nickel composite oxide is given. By the reaction with water vapor in the air, the lithium-nickel composite oxide deteriorates through the reaction (2) below. The byproduct adversely affects the cycle characteristics of the battery.

$$LiNiO_2 + H_2O \rightarrow NiOOH + LiOH \qquad (2)$$

Other examples of the active material B include a lithium-nickel-cobalt-manganese composite oxide containing much nickel, particularly a composite oxide with a Ni/Li molar ratio of 0.5 or more.

The preferable specific surface area of the active material A is 0.2 to 3 $m^2/g$. The preferable specific surface area of the active material B is 0.3 to 5 $m^2/g$. The preferable mixing ratio between the active material A and the active material B is 1:9 to 9:1 in mass ratio (A:B).

[Organic Moisture Capture Agent]

The organic moisture capture agent is an organic material. Therefore, the dissolving solvent common to the binder resin as the organic polymer can be used. Thus, the dispersibility of the organic moisture capture agent in the binder resin is excellent and the fixability of the organic moisture capture agent in the binder resin after curing is excellent. The organic moisture capture agent is homogeneously dispersed in the binder resin. Therefore, as described above, the organic moisture capture agent can be disposed more around the active material B with low resistance against water because of the large specific surface area. Accordingly, the deterioration of the active material B due to moisture can be effectively prevented.

The organic moisture capture agent preferably has a molecular weight of 46 to 500. By the use of the organic moisture capture agent as above, the further excellent dispersibility and fixability in the binder resin can be achieved. When the organic moisture capture agent has a molecular weight of less than 46, the organic moisture capture agent may be moved in the binder resin after the curing. When the organic moisture capture agent has a molecular weight of more than 500, the organic moisture capture agent may be dissolved in the slurry solution uneasily in the manufacture of the mixed electrode or the cohesion of the organic moisture capture agent may become so high that the dispersibility becomes poor.

Preferable examples of the organic moisture capture agent are an organic acid, a salt of an organic acid, and an organic material that can form a hydrate. Above all, an organic acid and a salt of an organic acid that can form a hydrate, such as oxalic acid, citric acid, or toluene sulfonic acid are given.

[Organic Binder]

The organic binder preferably includes an organic polymer. The binder is preferably the binder that is dissolved in organic solvent in the preparation of the slurry. This is because since the active material B, which reacts with water to deteriorate easily, is used in the present disclosure, the organic solvent is preferably used instead of the aqueous solution as the slurry solvent. An example thereof is polyvinylidene fluoride (PVDF). A PVDF copolymer having a hexafluoropropylene unit or a tetrafluoroethylene unit as a part may be used. The binder is not limited to the PVDF-based binder as long as the organic solvent can be used in the preparation of the slurry.

[Solvent]

The organic solvent is preferably used as the solvent for the slurry in the manufacture of the mixed electrode. For example, N-methyl pyrrolidone (hereinafter, NMP) is given.

EXAMPLES

Example 1

<Manufacture of Negative Electrode>

Spherical natural graphite powder (average particle diameter: 20 μm) coated with amorphous carbon as the negative electrode active material, polyvinylidene fluoride as the fluorine resin based binder resin, and carbon black conductive auxiliary agent were added to N-methyl-2-pyrrolidone (NMP) at a solid content mass ratio of 96.5:3:0.5. By stirring, these materials were dispersed homogeneously in NMP, thereby manufacturing the slurry. The obtained slurry was applied onto a copper foil with a thickness of 15 μm serving as a negative electrode current collector. Next, the slurry was heated for 10 minutes at 125° C. to evaporate NMP, thereby forming the negative electrode active material layer. Further, the negative electrode active material was pressed to manufacture the negative electrode having the negative electrode active material layer applied onto one surface of the negative electrode current collector.

<Manufacture of Positive Electrode>

$Li_{1.1}Mn_{1.9}O_4$ powder (with BET specific surface area of 0.25 $m^2$/g) with a spinel structure as the active material A (first active material) for the positive electrode, lithium-nickel-cobalt-lithium manganate (with a Ni/Li molar ratio of 0.7 and a BET specific surface area of 0.5 $m^2$/g) as the active material B (second active material) for the positive electrode, polyvinylidene fluoride as the binder resin, and carbon black powder as the conductive auxiliary agent were added to the solvent of N-methyl-2-pyrrolidone (NMP) at a solid content mass ratio of 69:23:4:4. Moreover, 0.03 parts by mass of an oxalic acid nonhydrate (molecular weight of 126) as the organic moisture capture agent were added to this mixture relative to 100 parts by mass of the solid content excluding NMP from the mixture. The materials were homogeneously dispersed by stirring, thereby manufacturing the slurry. The obtained slurry was applied onto a 20-μm-thick aluminum foil as the positive electrode current collector. Next, the slurry was heated for 10 minutes at 125° C. to evaporate NMP, thereby forming the positive electrode active material layer. Further, by pressing the positive electrode active material layer, the positive electrode having the positive electrode active material layer applied onto one surface of the positive electrode current collector was manufactured.

<Manufacture of Lithium Ion Secondary Battery>

The negative electrode and the positive electrode manufactured as above were cut out to have a size of 5 cm (width)×6.0 cm (length) each. A portion thereof with a size of 5 cm×1 cm on one side corresponds to an uncoated portion used for connecting a terminal. The size of the active material layer is 5 cm×5 cm. A positive electrode terminal made of aluminum with a width of 5 cm, a length of 3 cm, and a thickness of 0.1 mm was subjected to ultrasonic welding with a length of 1 cm at the uncoated portion of the positive electrode. Similarly, the negative electrode terminal made of nickel with the same size as the positive electrode terminal was subjected to ultrasonic welding with a length of 1 cm at the uncoated portion of the negative electrode. On both surfaces of a separator made of polyethylene and polypropylene with a size of 6 cm×6 cm, the negative electrode and the positive electrode were disposed with the active material layer overlapping with the separator interposed therebetween, whereby an electrode multilayer body was obtained. By attaching three sides of two aluminum laminated films with a size of 7 cm×10 cm except one long side thereof through heat sealing with a width of 5 mm, a bag-shaped laminated exterior body was manufactured. The electrode multilayer body was inserted to maintain a distance of 1 cm from one short side of the laminated exterior body. Moreover, 0.203 g of nonaqueous electrolyte solution as below was poured for impregnation in vacuum. After that, the opening portion was sealed with a width of 5 mm through heat sealing under reduced pressure, thereby providing the laminated secondary battery of this example.

As the nonaqueous electrolyte solution, lithium hexafluorophosphate ($LiPF_6$) as the electrolyte salt was dissolved into a nonaqueous solvent obtained by mixing ethylene carbonate (EC) and diethyl carbonate (DEC) at a ratio of EC:DEC=30:70, so that the concentration became 1.0 mol/L. Chain disulfonic ester as the additive was dissolved in the obtained solution so that the concentration became 0.5 mass %.

Example 2

A laminated secondary battery was manufactured by the same method as that in Example 1 except that an active material with a BET specific surface area of 0.4 $m^2$/g was used as the active material A for the positive electrode.

Comparative Example 1

A laminated secondary battery was manufactured by the same method as that in Example 1 except that an active material with a BET specific surface area of 0.6 $m^2$/g was used as the active material A for the positive electrode.

Comparative Example 2

A laminated secondary battery was manufactured by the same method as that in Example 1 except that an active material with a BET specific surface area of 0.8 $m^2$/g was used as the active material A for the positive electrode.

<Cycle Characteristics Evaluation>

The four laminated secondary batteries manufactured as above were subjected to the cycle tests as below.

Charging and discharging were repeated for 500 cycles under a 55° C. environment using the battery voltage between 4.2 V (SOC (State of Charge: battery capacity) 100%) and 3 V (SOC 0%) and the current that discharges the initial capacity in an hour (discharge current that requires one hour to make the SOC-100% state of the initial battery the SOC-0% state, hereinafter referred to as 1 C current). The capacity retention was calculated from the formula (battery capacity after 500 cycles)/(initial battery capacity). The case in which the desired capacity retention was obtained was shown as "good" and the case in which the capacity retention obtained was a little lower than the desired one was shown as "fair". The results are shown in Table 1.

TABLE 1

| Table | Specific surface area ratio (active material A/B) | Capacity retention (%) | Determination |
|---|---|---|---|
| Example 1 | 0.5 | 70 | Good |
| Example 2 | 0.8 | 68 | Good |
| Comparative Example 1 | 1.2 | 60 | Fair |
| Comparative Example 2 | 1.6 | 58 | Fair |

The results indicate that the capacity retention is more favorable as the specific surface area ratio (specific surface area of active material A)/(specific surface area of active material B) is smaller. It is understood that the desired capacity retention is obtained in a region where the value of the ratio is less than 1, i.e., the region where (specific surface area of active material A)<(specific surface area of active material B).

Examples of the present disclosure have been described so far; however, the present disclosure is not limited to the examples described above.

The invention claimed is:

1. A mixed electrode for a nonaqueous electrolyte battery, comprising:
    a first active material;
    a second active material that reacts with water more easily than the first active material;
    an organic binder that binds the first active material and the second active material; and
    0.001 to 10 parts by mass of an organic moisture capture agent relative to 100 parts by mass of the organic binder,
    wherein the organic moisture capture agent is at least one of an organic acid or a salt thereof with a molecular weight of 46 to 500 and is dispersed in the organic binder;
    wherein the first active material has a smaller specific surface area than the second active material;
    wherein the first active material is at least one of a lithium-manganese composite oxide, a lithium-nickel-cobalt-manganese composite oxide with a Ni/Li molar ratio of less than 0.5, an olivine lithium composite oxide, or a lithium cobaltate; and
    wherein the second active material is lithium-nickel-cobalt-manganese composite oxide with a Ni/Li molar ratio of 0.5 or more.

2. A manufacturing method for a mixed electrode for a nonaqueous electrolyte battery, comprising:
    preparing slurry including at least a first active material, a second active material that reacts with water more easily than the first active material and that has a larger specific surface area than the first active material, an organic binder, a solvent, and 0.001 to 10 parts by mass of an organic moisture capture agent relative to 100 parts by mass of the organic binder; and
    applying the slurry;
    wherein the first active material is at least one of a lithium-manganese composite oxide, a lithium-nickel-cobalt-manganese composite oxide with a Ni/Li molar ratio of less than 0.5, an olivine lithium composite oxide, or a lithium cobaltate;
    wherein the second active material is a lithium-nickel-cobalt-manganese composite oxide with a Ni/Li molar ratio of 0.5 or more; and
    wherein the organic moisture capture agent is at least one of an organic acid or a salt thereof with a molecular weight of 46 to 500.

3. The manufacturing method for a mixed electrode for a nonaqueous electrolyte battery according to claim 2, wherein the organic binder and the organic moisture capture agent are dissolved in the solvent.

4. The mixed electrode for a nonaqueous electrolyte battery according to claim 1, wherein the organic binder is 0.5 to 20 parts by mass relative to 100 parts by mass of the first and second active materials.

5. The manufacturing method for a mixed electrode for a nonaqueous electrolyte battery according to claim 2, wherein the preparing step further comprises that the organic binder is 0.5 to 20 parts by mass relative to 100 parts by mass of the first and second active materials.

* * * * *